United States Patent [19]

Bullard, III

[11] 3,936,943
[45] Feb. 10, 1976

[54] MEASURING SYSTEM

[76] Inventor: Edward P. Bullard, III, MTD Building, 171 Spring Hill Road, Trumbull, Conn. 06611

[22] Filed: Apr. 15, 1974

[21] Appl. No.: 460,720

[52] U.S. Cl. .................... 33/125 R; 33/125 M
[51] Int. Cl.² .......................................... G01B 5/02
[58] Field of Search ......... 33/125 R, 125 M, 141 R, 33/141 F, 141.5, 1M, 23 C, 129

[56] References Cited
UNITED STATES PATENTS

| | | | |
|---|---|---|---|
| 578,718 | 3/1897 | Buford | 33/129 |
| 1,296,566 | 3/1919 | Stratton | 33/141 R |
| 1,560,392 | 11/1925 | Mager | 33/129 |
| 2,033,970 | 3/1936 | Anderson | 33/141.5 |
| 2,048,488 | 7/1936 | Begun | 33/129 |
| 2,253,701 | 8/1941 | Grunbaum | 33/129 |
| 2,484,151 | 10/1949 | Brownell | 33/141 F |
| 3,006,075 | 10/1961 | Roch | 33/125 R |
| 3,239,941 | 3/1966 | Ahmer | 33/125 R |
| 3,447,244 | 6/1969 | Scholl | 33/125 M |
| 3,526,890 | 9/1970 | Malina et al. | 33/125 M |
| 3,638,220 | 1/1972 | Malina et al. | 33/129 |
| 3,732,623 | 5/1973 | Bopst | 33/141 R |
| 3,802,082 | 4/1974 | Gornowitz | 33/141 R |

FOREIGN PATENTS OR APPLICATIONS 523,704  11/1953  Belgium .................. 33/125 M Primary Examiner—Richard E. Aegerter
Assistant Examiner—John W. Shepperd
Attorney, Agent, or Firm—St. Onge Mayers Steward & Reens

[57] ABSTRACT

In connection with a mechanical system comprising a relatively movable part and a relatively stationary part, a tensioned linearly extended tape having precisely spaced openings along its length is attached at its extremities to one of the two mentioned parts. A measuring apparatus including read-out means is attached to the other of the parts in a location which lies in the line of extension of the tape. The tape is caused to pass through the measuring apparatus, where it is retained in a partial wrap-around assembly with a rotatable cylinder having circumferentially distributed surface projections that engage the tape openings. Relative motion of the two parts of the mechanical system effects rotation of the cylinder, which, in turn, causes an indication of the relative motion of the parts to be produced at the read-out point. Means are provided which enable the operator to convert at will from English to metric read-out.

8 Claims, 28 Drawing Figures

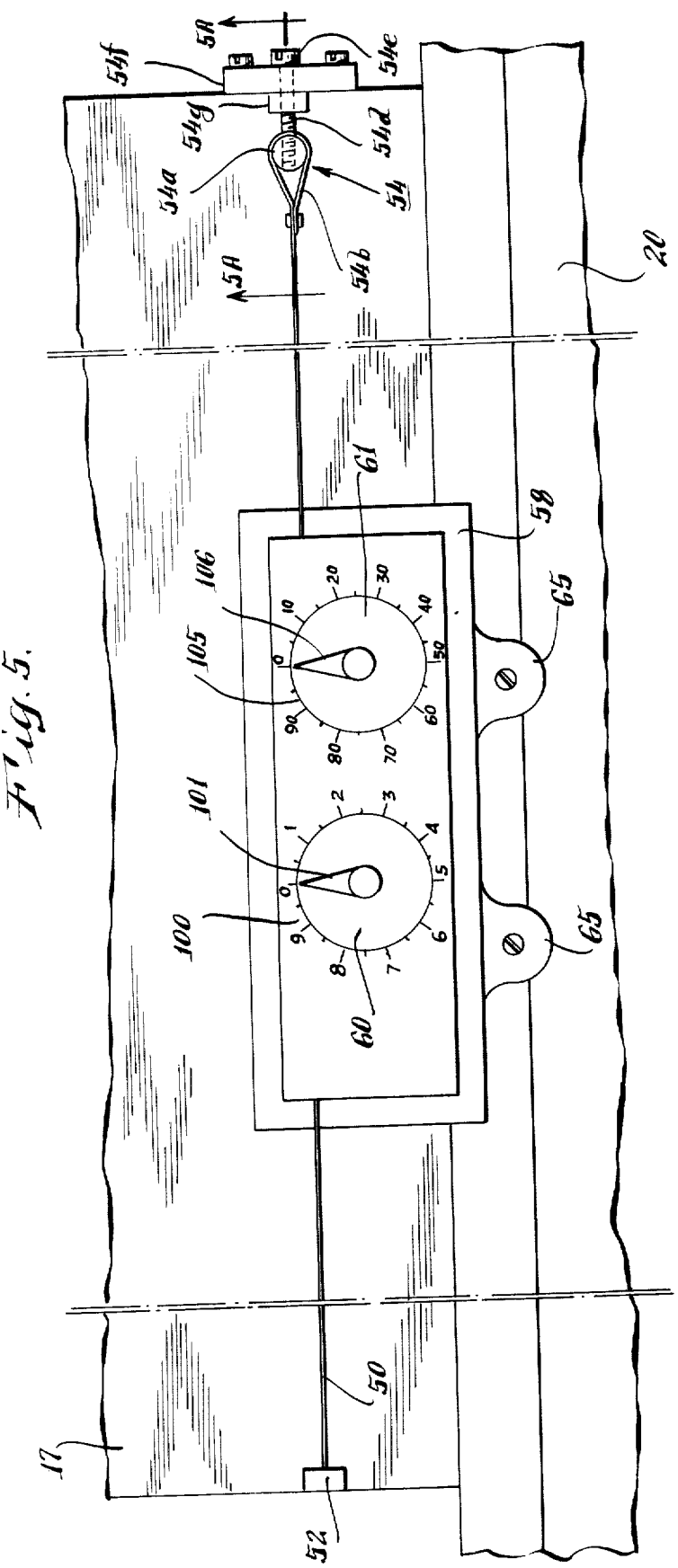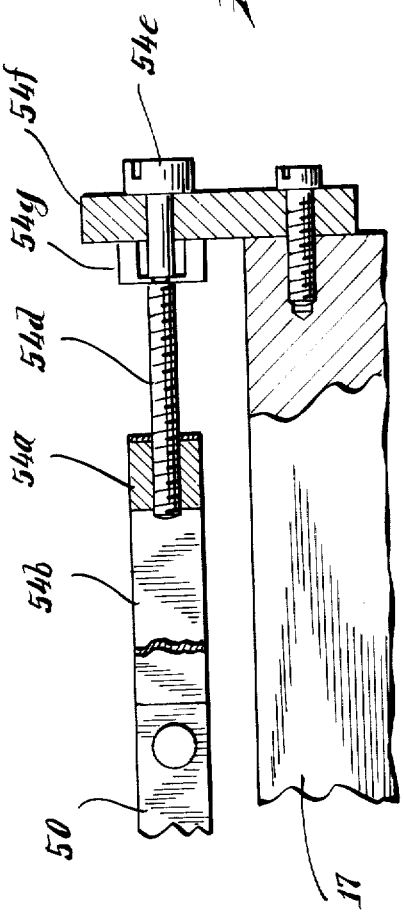

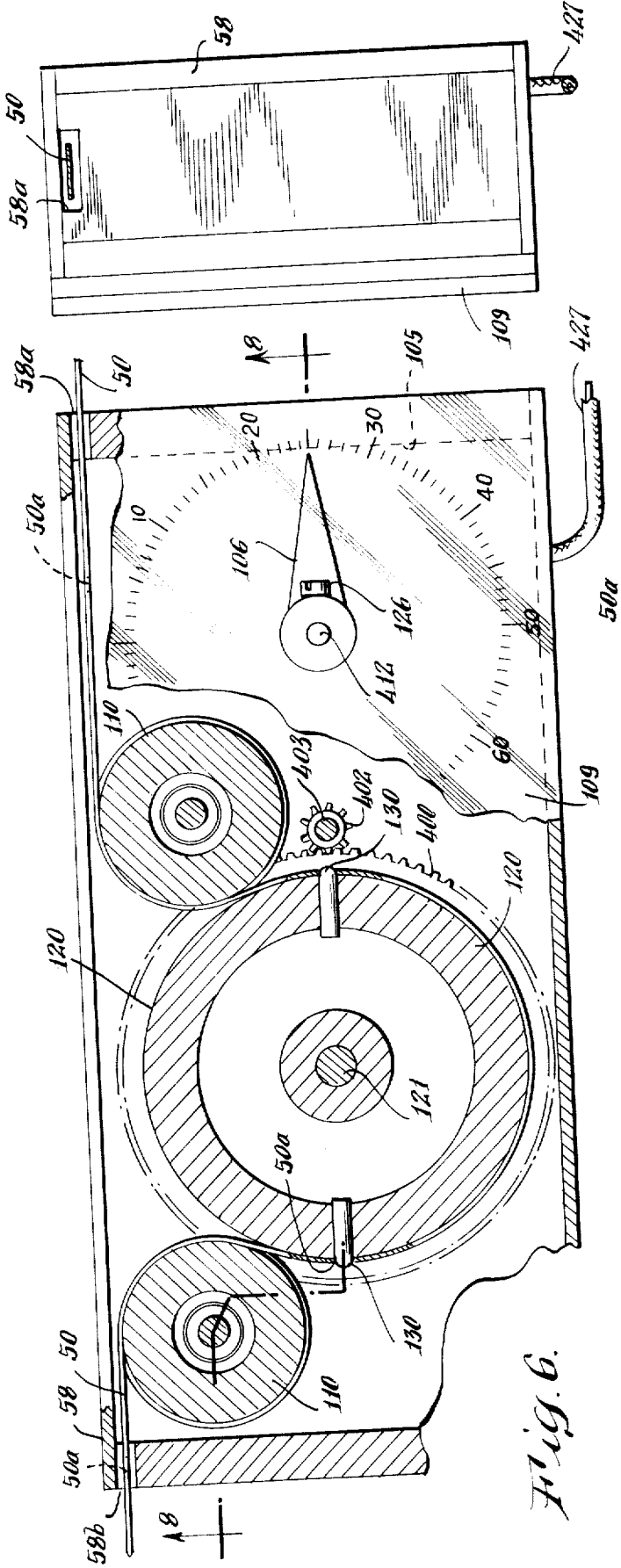
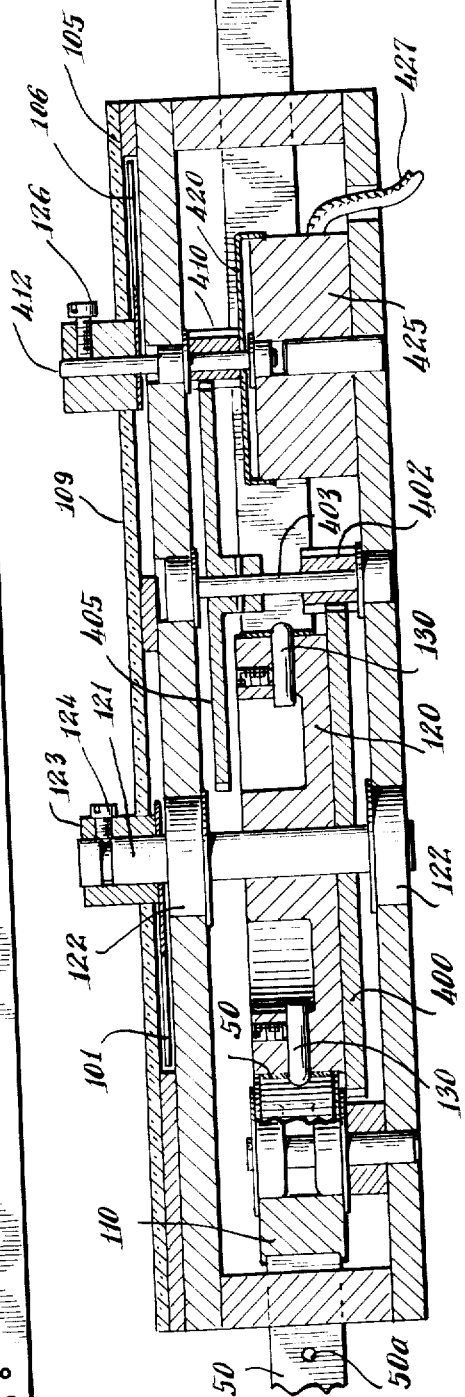

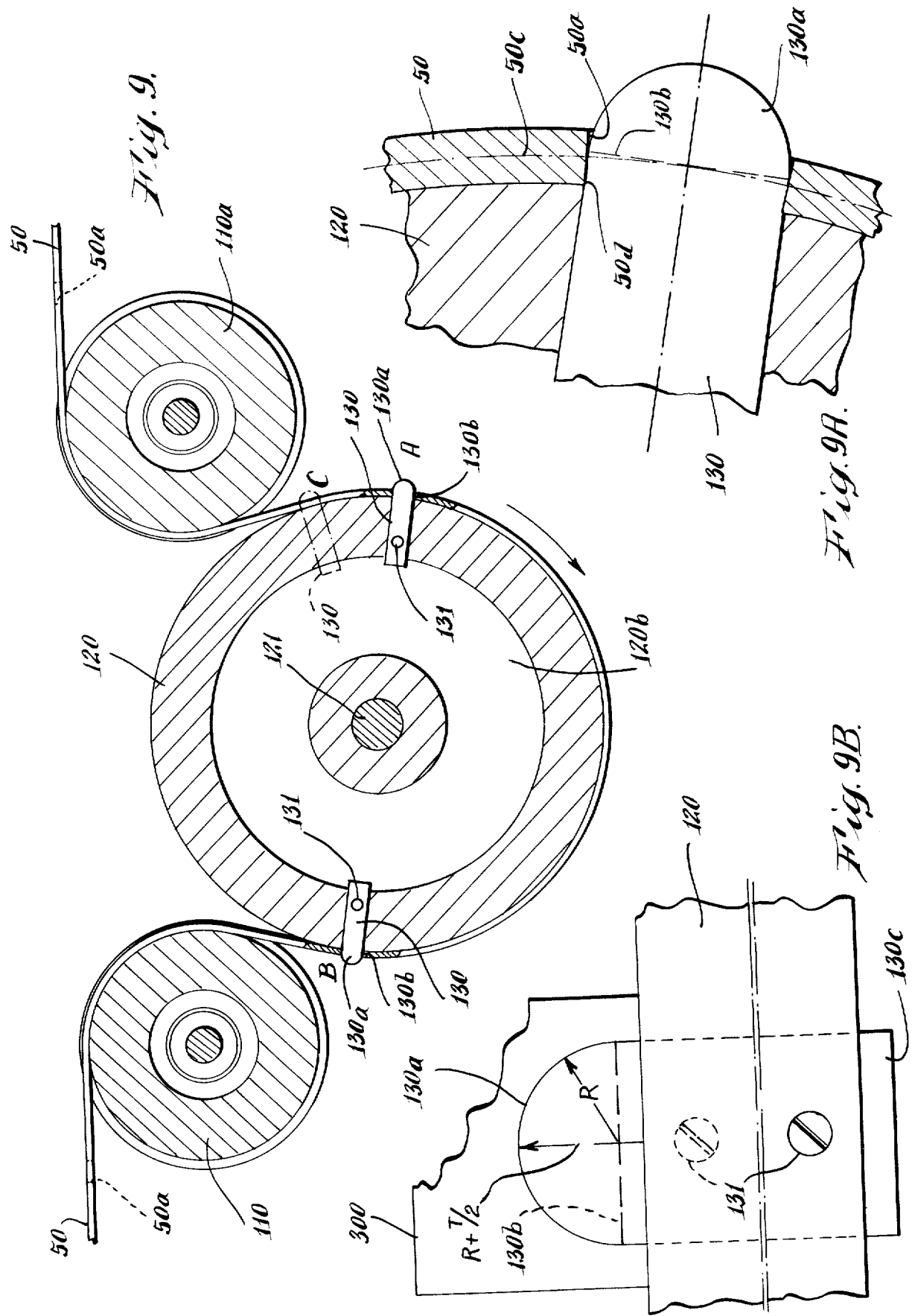

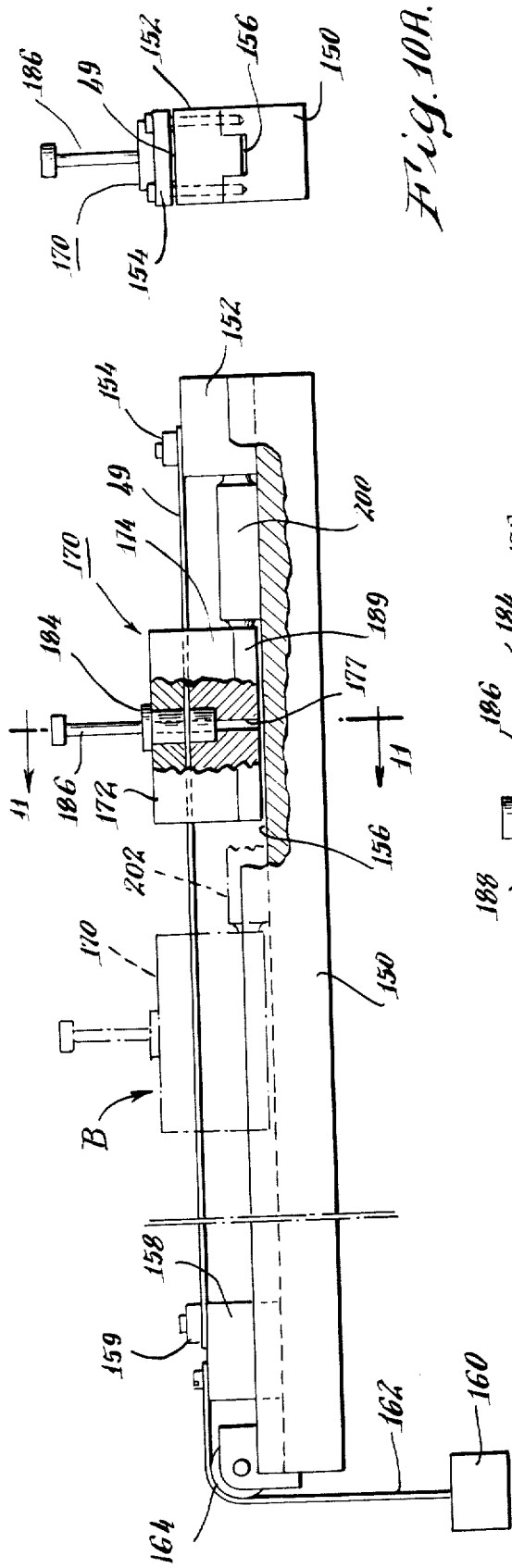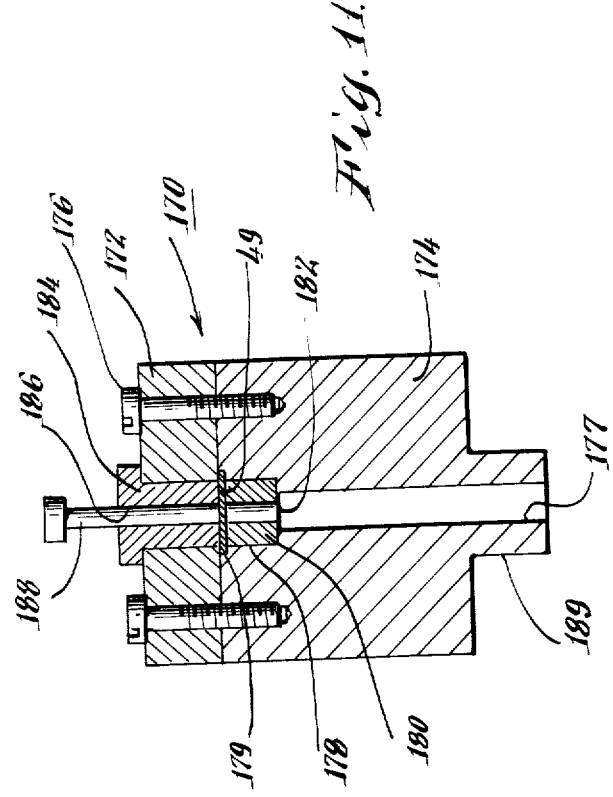

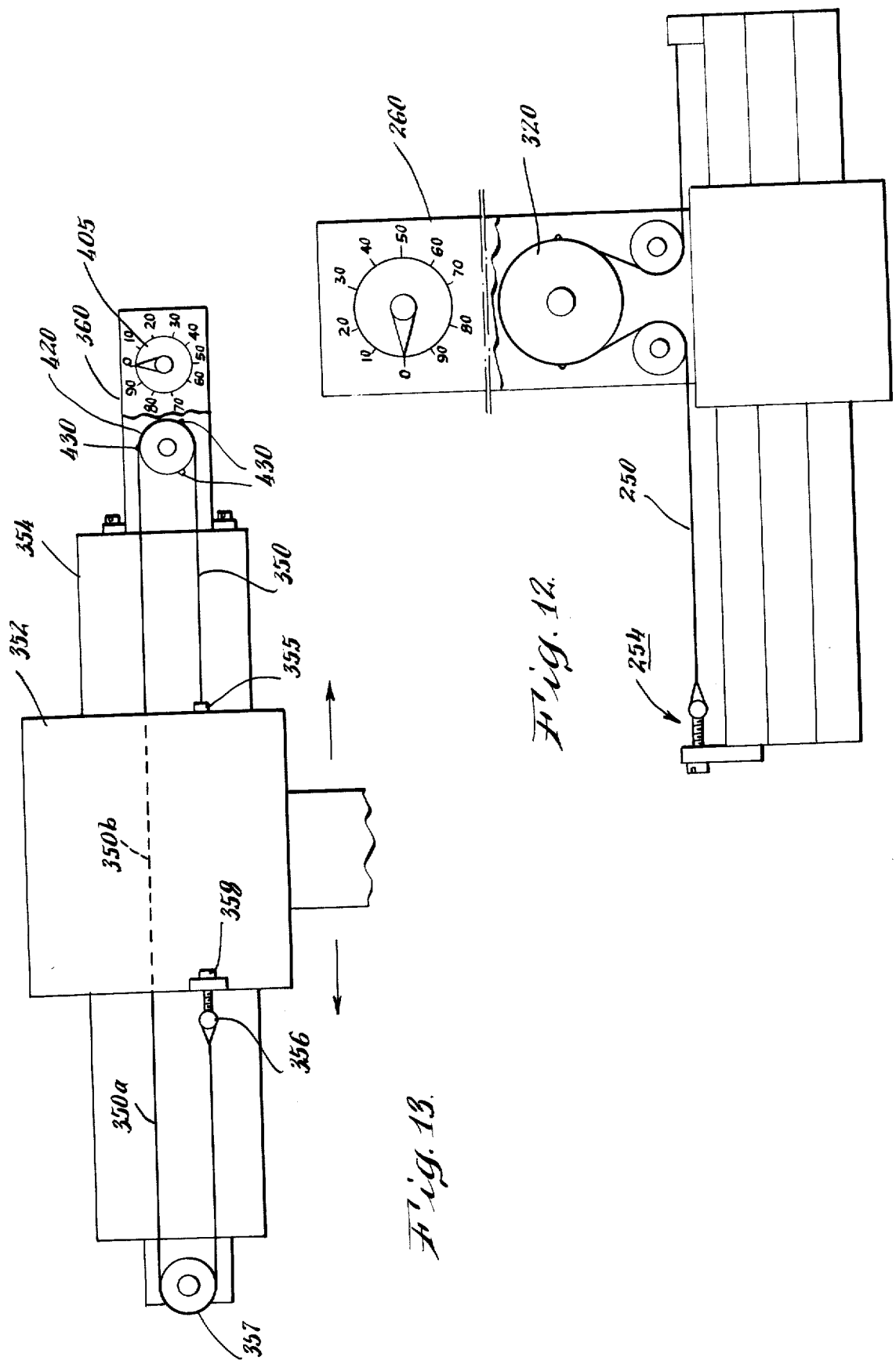

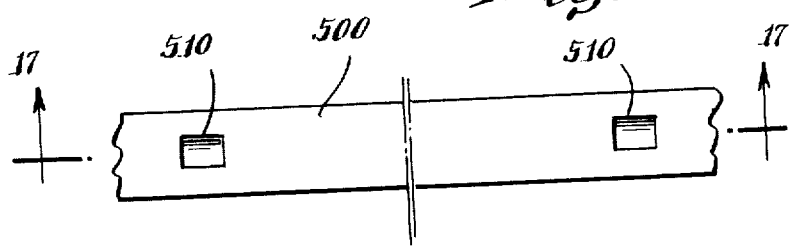
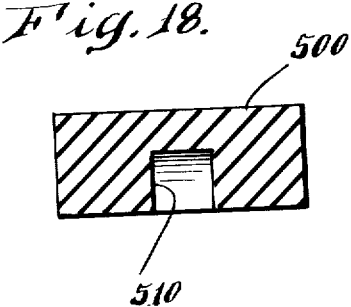
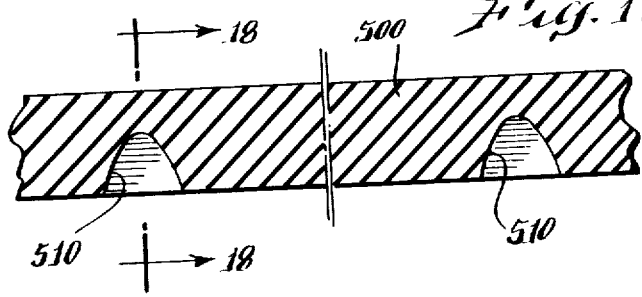
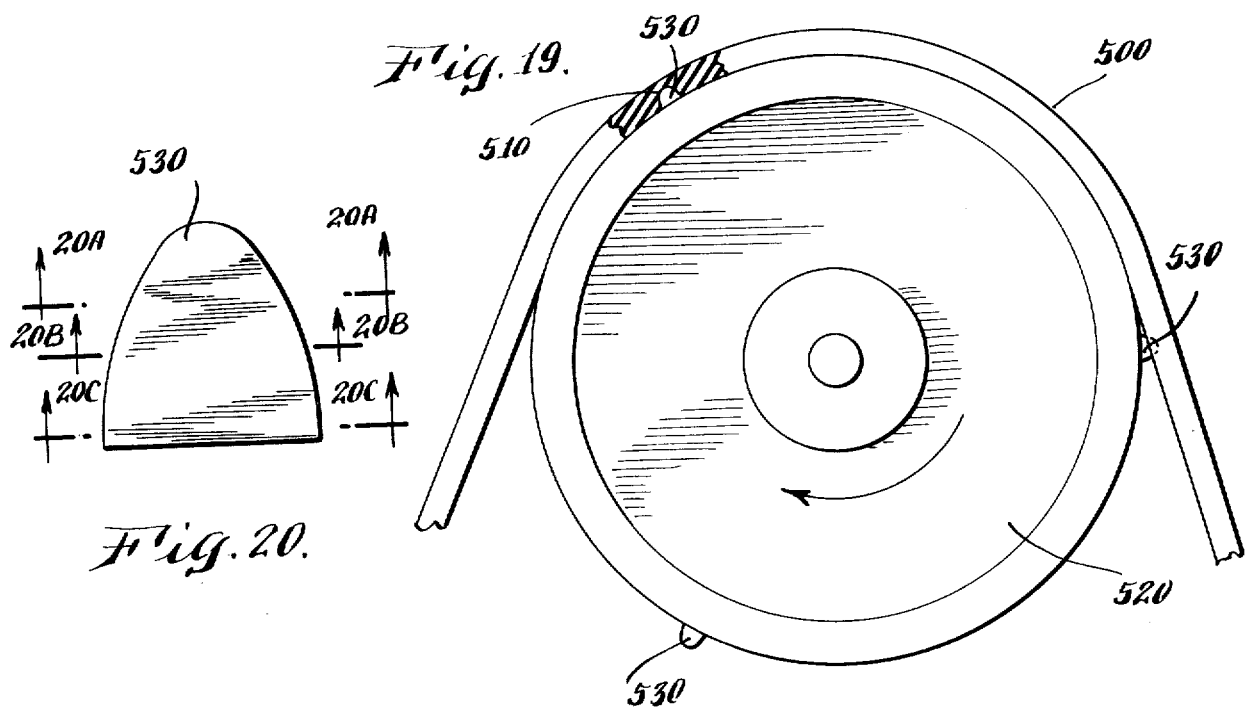
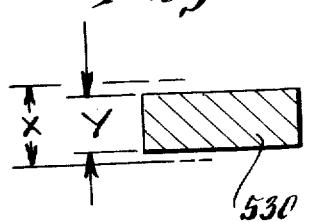
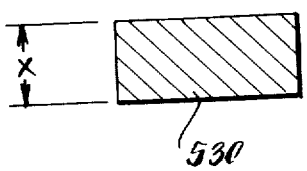
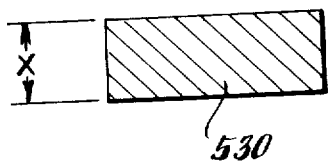

MEASURING SYSTEM

The invention concerns apparatus for measuring linear distances with high accuracy and reliability. Its use is typified by but not limited to application in machine tool systems.

BACKGROUND AND BRIEF SUMMARY OF THE INVENTION

Economical precision manufacture of mechanical parts, particularly those made in small quantities, requires that the relative displacement of the members of the machine upon which they are produced be quickly and accurately determinable at all times. In the past, attempts to meet this requirement have involved use of one or more of the following, associated in most cases with graduated dials, cursors, and other read-out means:
1. Lead screws and nuts
2. Rack and pinion mechanisms.
3. Standard length measures, (such as Johansson blocks).
4. Optical systems, generally associated with very high magnification.
5. Electronic systems in which a series of electrical fields interact upon relative displacement.
6. Friction-dependent systems, in which
    a. a cylinder or disc of known diameter is held against a flat surface so that relative motion of the cylinder support means and the surface causes the cylinder to rotate, or
    b. a cable or tape is wrapped about a cylinder in such a way that rotation of the cylinder is produced by frictional engagement between the cylinder axis and the capable or tape.
7. Rotary drum systems in which a cable or tape is wrapped spirally about a drum, as in an elevator hoist.
8. Systems combining two or more of the above.

Either initially or with the passage of time, all of the above systems prove subject to one or more of the following deficiencies:
1. Absolute error produced by irreducible errors in manufacture.
2. Backlash errors — as when a screw and rack system is moved to the same position from opposite directions.
3. Accumulative errors — as when a very slight error developed in movement to a first operating position is increased by a similar error occurring during movement to a second operating position.
4. Errors which increase in proportion to use — as is the case in all systems dependent solely upon frictional engagement.
5. Errors due to stress, as when varying the load on the member being moved causes a variable error in the means used to determined the ultimate position of the member.
6. Errors caused by misalignment of the relatively moving member and the measuring means.
7. Operator errors attributable to inherent difficulties in reading or setting the measuring means.

The many expedients adopted by various manufacturers to minimize these difficulties have inevitably tended to multiply costs without in any case providing a fully satisfactory solution to the underlying problem.

It is an object of the present invention to provide lost cost measuring apparatus which has the following advantages over prior devices:
1. Simplicity of design and manufacture leading to minimum possibility of absolute errors in construction.
2. Avoidance of the possibility of backlash, or of accumulative, progressive or relative errors.
3. Avoidance of error resulting from strain on machine parts.
4. Minimization of errors due to machine misalignment or operator carelessness.
5. Capability of being read continuously without change or adjustment and the capacity to measure in both the positive and negative directions.
6. Availability of a full floating zero or datum point.
7. Capability of measuring at machine movement speeds in excess of 200 inches per minute and over distances of up to 50 feet.
8. Read-out capability in either the English or metric systems.

The invention employs the concept that a flexible tape engaging a rotatable cylinder of known dimensions, can, upon relative motion between the tape and the cylinder surface, cause the resulting rotation of the cylinder to perform a measuring function. However, the invention provides means for overcoming the defects of prior tape driven systems which have militated against satisfactory performance of such systems in situations in which very high precision measurement is essential. In particular, arrangements are provided which entirely avoid reliance upon surface friction as a means for producing relative motion between engaging parts.

More specifically, the invention employs an extended tape (or similar continuous elongated flexible member) having a number of equally spaced, precisely formed holes, the spacing of which is exactly known as long as the tape is subjected to appropriate longitudinal tensile stress. Combined with the tape is a cylinder having its diameter related in a critical way both to the parameters of the measuring system which is to be employed and to the location of the pitch line of the tape as it is bent around the periphery of the cylinder. In operation, the tape is maintained in a partial wrap-around relationship with the cylinder. Precisely controlled relative motion between the tape and cylinder during rotation of the latter is achieved by provision on the cylinder of tape-engaging elements, the spacing of which (measured along a critical circle), is precisely that of the tape openings, and the configuration of which is appropriately related to that of such openings. The cylinder is connected through high quality gearing to a precisely calibrated read-out system, the reading of which is controlled by rotation of the cylinder as effected by relative motion between it and the tape.

In applying the combination as so far described to a structural system (e.g. a machine tool) having a movable part and a fixed part, attachment means are provided such that the axis of the cylinder is maintained transverse to the direction of motion of the movable part and the principal longitudinal extension of the tape is maintained parallel to that direction. Either the extremities of the tape are attached to the movable part of the structural system with the cylinder being borne by the fixed part, or the reverse condition is maintained. Under either of these conditions, it is found that the relative motion of the tape and cylinder which occurs when the movable part is shifted from one position to another will, through the resulting rotation of the cylinder, produce a read-out of the part movement with an accuracy (in the English system) of or better than one ten-thousandth of an inch. By operator switch-in of a translation gear chain between the cylinder and the read-out mechanism, read-out with similar accuraucy can immediately be obtained in the metric system.

Particulars of the invention, as well as its further objects and advantages, may best be understood by reference to the following detailed description, taken in connection with the accompanying drawings.

In the drawings:

FIG. 5 is an enlarged segment of FIG. 1 which shows in further detail the relationship of certain principal elements of the invention as illustrated in FIGS. 1 and 2;

FIG. 5A is a further enlargement of certain elements of FIG. 5 shown in section along line 5A—5A;

FIG. 6 is a still further enlarged and partially cut away detail of part of FIG. 5;

FIG. 6A is a view of segment of one element of FIG. 6, taken in the orthogonal plane;

FIG. 7 is an end view of FIG. 6;

FIG. 8 is a section taken on line 8—8 of FIG. 6;

FIG. 9 is a greatly enlarged detail of certain parts of FIG. 6, shown in a slight altered condition of operation;

FIG. 9A is a still further enlarged view of certain elements of FIG. 9;

FIG. 9B is a sectional view illustrating the mode of assembly of certain parts shown in FIG. 9A;

FIG. 10 is a side elevation (partial cut away) showing one phase of production of a critical part of the invention;

FIG. 10A is an end view of FIG. 10.

FIG. 11 is an enlarged section taken on line 11—11 of FIG. 10;

FIG. 12 is a side view, partially broken away, to show the use in context of a modified assembly of the principal elements of the invention;

FIG. 13 is a side view, again partially broken away, of a special mode of application of the invention;

FIG. 16 is a broadside view of an elongated driving member useful as an alternative to the metal tape of FIGS. 1 through 15;

FIG. 17 is a section taken on line 17—17 of FIG. 16;

FIG. 18 is a section taken on line 18—18 of FIG. 17;

FIG. 19 is a plan view of an assembly for applying the elongated member of FIG. 16;

FIG. 20 is a view of an enlarged profile view of one element of FIG. 19; and

Figure 1:
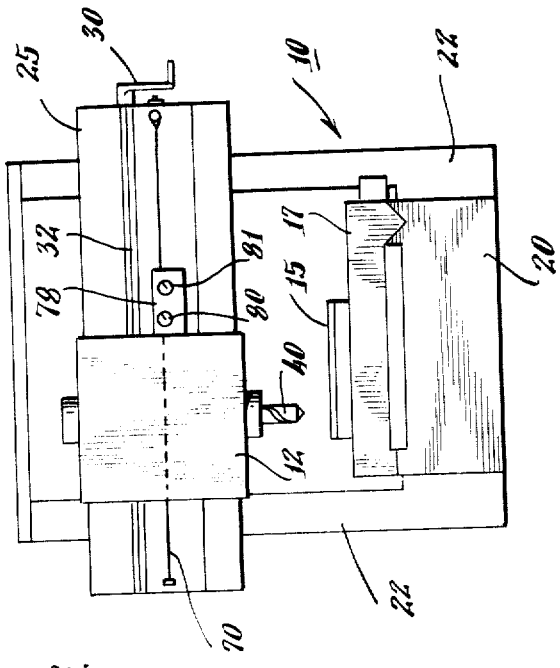
FIGS. 1 and 2 are side elevation views of a typical machine tool, shown in two successive conditions of operation to illustrate one context of use of the invention.

FIGS. 20A, B and C are successive sections taken as indicated in respect to FIG. 20.

Referring now to the conjunction of FIGS. 1 through 4, these show schematically a precision boring machine 10 of a type in which the drill-bearing saddle 12 is mounted for horizontal traverse. In all these figures a work piece 15 is shown as being supported on a sliding table 17 which in turn is borne upon a stable bed 20. As will be seen by comparison of FIGS. 1 and 2, the table 17 may be moved from left to right (and returned) for the purpose of positioning the work piece along the left-right axis. It is assumed that controllable drive means (not shown) are provided for carrying out the positioning function.

Uprights 22 connected to the bed 20 support a cross rail 25 upon which the saddle 12 is mounted for horizontal motion, as previously stated. A crank 30 connecting with a lead screw 32 is shown as a possible means for controlling the position of the saddle 12, but it will be understood that an automatically controlled machine drive may alternatively be used for this purpose. It will be further understood that driving means are provided within the saddle 12 for controlling the motion of the drill 40 in the vertical direction and that suitable means for rotating the drill are also incorporated in the assembly shown.

Figure 3:
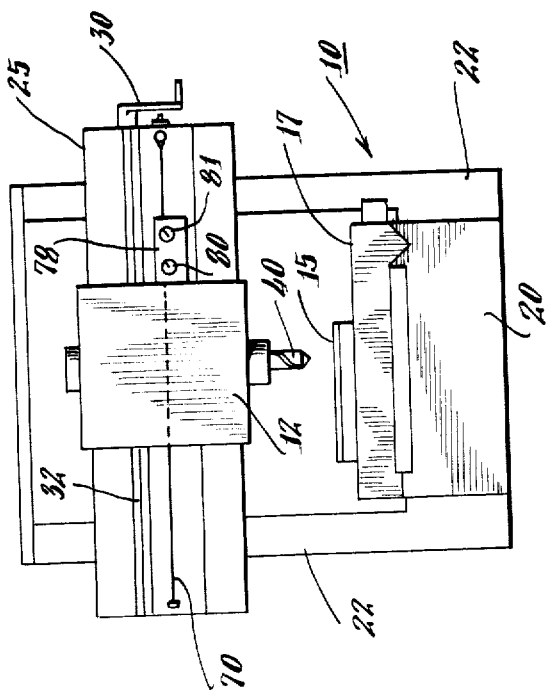
FIGS. 3 and 4 are front elevation views of the assembly of FIGS. 1 and 2, again shown in two successive conditions of operation to illustrate a second context of use of the invention.
Figure 2:
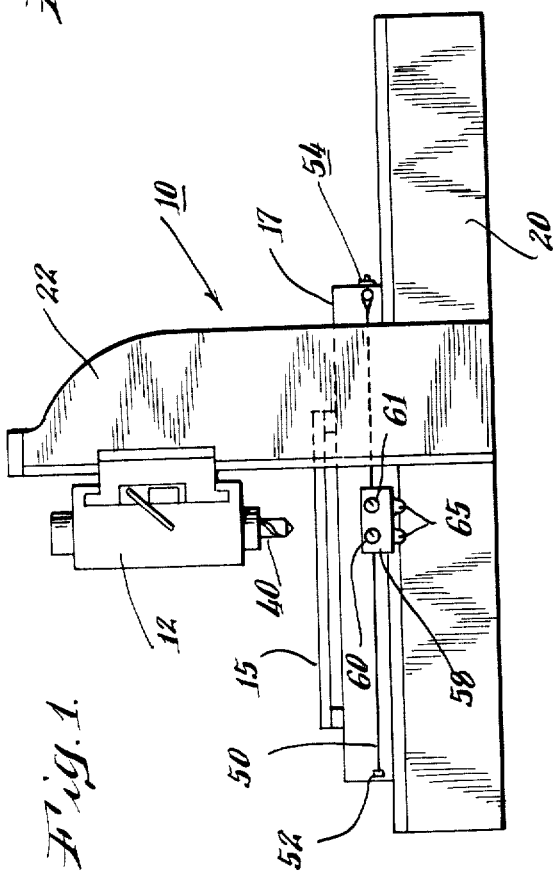
Figure 4:
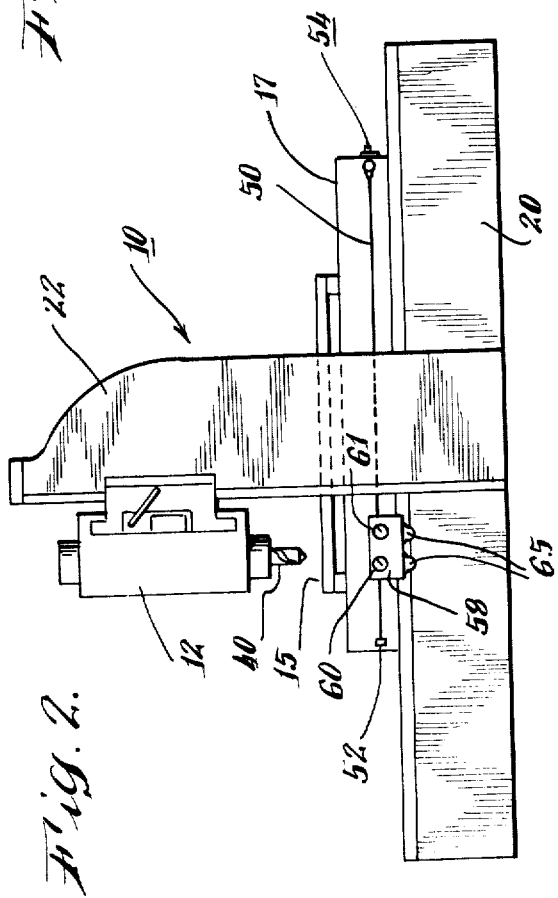

FIGS. 1 and 3 conjointly show the work piece 15 and the saddle 12 in what may be taken as a starting position from which their subsequent movement is desired to be accomplished with highly measurable precision. In FIG. 2 the work piece is shown as having been moved significantly to the right from the location which it occupied in FIG. 1, and in FIG. 4 the saddle 12 is shown as being similarly moved to the right from the position which it occupies in FIG. 3. Appropriate means for effecting movement of the work piece table 17 are, of course, assumed, although such means are not specifically illustrated. It is with improved apparatus for the precise measurement of the relative movement of the various parts just referred to that the present invention is primarily concerned. For specific illustration, and referring again to FIGS. 1 through 4, application of the invention is indicated both in connection with the movable saddle 12 and the movable table 17. In connection with FIGS. 1 and 2, for example, there is shown an elongated gaging member 50 (e.g. a tape). This member, of which only the narrow edge is seen, extends along the side of the table 17, being fixedly secured at one end by a pin 52 and at the other end by a tensioning device 54, the details of which will be specified at a later point. Also, as will later appear in detail, the tape 50 passes through a casing 58 which may be assumed to contain metering elements interacting with the tape and which is shown as having read-out dials 60 and 61 on its outer surface. The casing 58 is solidly affixed to the bed 20, for example, by attachment means indicated at 65. As will further appear, the tape 50 and the elements within the casing 58 are combined in an assembly (to be later described) by which one can measure with great accuracy the movement of the table 17 as it proceeds, for example, from the position shown in FIG. 1 to the altered position shown in FIG. 2. A generally similar assembly, having a corresponding measurement function in relation to movement of the saddle 12, is shown in FIGS. 3 and 4 as comprising the combination of a tape 70 and a casing 78 carrying read-out dials 80 and 81. In this case the casing 78 is associated with the movable saddle 12 while the tape 70 is affixed to the stationary cross rail 25. It will be recognized, however, that even under these changed circumstances, movement of the saddle produces relative motion between the tape and the casing 78 which in practical effect corresponds exactly to the relative motion produced between the tape 50 and the casing 58 by motion of the former.

Further details of one segment of the apparatus just described are shown in an enlarged scale in FIG. 5 in which various parts correspond to similarly numbered parts shown in FIGS. 1 and 2. Thus, at the left hand end of FIG. 5 is shown the fixed member 52 to which one etremity of the gaging tape 50 is attached, while at the right hand end of the Figure there is shown an assembly 54 which is attached to the extremity of the tape 50 and by means of which appropriate tensile stress is applied to the tape. Because this assembly plays an important role in the functioning of the invention, its details are shown in still greater particularity in FIG. 5A. Specifically, the assembly 54 includes a rod or pin 54a which is passed through a loop or bight formed at the end of the tape 50 as indicated at 54b. The pin 54a includes a threaded opening aligned with a similarly sized hole punched in the right hand central portion of the tape loop 54b. Through this hole a threaded bolt 54d engages the threaded opening just referred to. This bolt has a slotted head 54e which abuts against a retaining plate 54f through which the bolt passes as shown, and which is engaged on its inner face by a lock nut 54g. With the arrangement indicated it will be apparent that rotation of the bolt head 54e will apply controlled tensile stress to the tape 50 by exerting more or less pull on the pin 54a as desired. As will appear, this feature contributes importantly to the accurancy of the measuring system as a whole.

Also illustrated in some detail in FIG. 5 are the read-out arrangements provided on the outer surface of the casing 58. These include a left hand dial 60 having peripheral markings 100 (shown incompletely because of scale) which, under circumstances shortly to be described, provide, by rotation of the index hand 101, a numeralized read-out in tenths of inches. They further include a second dial 105 which is calibrated so that its numeralized sub-divisions provide direct readings of thousandths of inches (and, by interpolation, ten thousandths of inches) as the index hand 106 rotates. The specific mechanisms by which these results are achieved through use of the present invention will now be described.

FIGS. 6 and 7 show a general way the manner in which the tape 50 (and, by analogy, the tape 70 of FIGS. 3 and 4) is caused to interact with measurement-producing devices contained within the associated casing. Before explaining this interaction, however, it will be useful to further describe the tape 50 in the form in which this element is employed in a preferred embodiment of the invention. To this end, FIG. 6a shows a segment of the tape in a plane orthogonal to that represented in FIG. 6. While the tape may take variant forms, I have achieved excellent results with a ribbon of heat-treated spring steel ½ inch wide and 0.004 inch in thickness. The particular steel employed is rated 58 Rockwell C and has a yield strength of 380,000 pounds per square inch and a modulus of elasticity of 30,000,000 pounds per square inch.

As further appears in FIG. 6a, the tape 50 is provided along its length with a series of precisely-spaced holes 50a, these being shown circular by way of a prefered example. As will be further explained at a later point, the holes are produced with the tape maintained under a definite or predetermined tensile stress and with their centers spaced by a linear distance which is known to a precision not less than one ten-thousandths of an inch as long as the tape is maintained under corresponding stress. Moreover, it is contemplated that when the tape is used in the combination illustrated in FIG. 6, it will be maintained under the appropriate tensile stress by adjustment of the tensioning assembly 54 previously described in connection with FIG. 5. A spacing which has been found specially appropriate for application in the measurement system of the present invention is 5 inches, although multiples and sub-multiples of this figure would also serve, subject to scaling up or down the corresponding dimensions of the remainder of the apparatus. For an application of the invention designed exclusively for use in the metric system, a hole spacing of 10 centimeters (or some appropriate multiple thereof) would be correspondingly appropriate.

Referring again to FIG. 6, it will be seen that, for a left-to-right movement of the casing 58, the tape enters the casing through an opening 58a at the right hand end of the casing and leaves the casing at a similar opening 58b provided at its opposite extremity. Between these two openings the tape passes over idler pulleys 110 and by these pulleys is held in contact with the peripheral surface of an intermediate cylinder or wheel 120. For reasons which will appear, the idlers 110 are so located in this particular embodiment as to maintain the tape in contact with the cylinder periphery over at least 50%, and preferably over something greater than 50% of its circumference. In a particular case a contact arc of 195° has been found appropriate. At diametrically opposed regions of its periphery the cylinder 120 has outwardly directly projections 130, the assembly of the tape and cylinder being such that these projections respectively coincide with and extend into two successive openings 50a formed in the tape. To make this possible, the peripheral dimensions of the cylinder must be properly correlated with the spacing of the openings. Since the nature of this correlation is important to the intended functioning of the apparatus as a whole, it is indicated in detail in the enlarged illustration of selected parts of the apparatus shown in FIG. 9.

Referring to FIG. 9, the cylinder 120 and the idler pulleys 110 and 110a are shown in substantially the relationship which they occupy in FIG. 6, although the cylinder 120 has been turned about 15° from the position which it occupies in that Figure in order better to illustrate the operating function of the projections 130. The cylinder 120 and the idlers 110 may be assumed to be about ½ inch (or a little more) in axial extension so that their peripheral surfaces are in full contact with the tape 50. The essential function of the projections 130 is to inter-engage with successive ones of the circular openings formed in the tape 50 as they come into concurrence with the projections. To serve this function, the projections must be of such shape at their outer extremities as readily to enter and retract from the openings 50a upon relative rolling motion between the cylinder 120 and the tape. A generalized condition for the fulfillment of this objective is that each projection must have, about a center which lies in the surface of revolution containing the effective pitch line of the tape, a transverse cross-section (i) which coincides with the shape of the tape openings and (ii) which further has, in the plane which contains both the pitch line and the center lines of said openings, a cross-section the leading and trailing edges of which approximate an involute curve constructed upon the periphery of the cylinder 120. I have found, however, that where the openings in the tape 50 are circular, as in the case presently being considered, the foregoing conditions are sufficiently approximated if each of the projections 130 terminates in a hemisphere 130a, the great circle of which (i) has a center that lies approximately in the surface of revolution that contains the effective pitch line of the tape and (ii) has a diameter that matches the diameter of the opening in the tape. This case is illustrated in FIG. 9A where one of the hemispheres referred to is represented at 130a and where one of the great circles referred to is located at 130b. *The pitch line of the tape 50 is indicated by the dot-dash line 50c,* and, for tapes having the thickness specified (i.e. 0.004 inch), will lie very close to midway between the opposite major surfaces of the tape.

As a matter of definition, the length of arc of the circular pitch line 50c which lies between the center lines of two adjacent openings 50a as perceived at the pitch circle 50c is precisely equal to the displacement of these center lines when the tape is restored to a straightened condition. However, because of distortion of the tape which occurs during bending, the same cannot be said of measurements taken along either major surface of the tape. Better understanding of this point may be gained from consideration of FIG. 9A, which shows on a magnified and intentionally exaggerated scale a small segment of the tape and projection assembly which lies at position A in FIG. 9. In this Figure, it will be seen that bending the tape 50 about the cylinder 120 introduces a slight elongation of the tape in the region outside the pitch line and a slight compression of the tape in the region which lines nearer the surface of the cylinder 120. The pitch line 50c, however, lies in (or approximately in) a "neutral" region of the tape which is substantially free of either elongation or fore-shortening. If, as has been previously postulated as a matter of design, the center of the great circle 130b of the hemispherical projection part 130a lies in the pitch line 50c, and if (as is again the principle of design employed) the diameter of that circle closely matches the diameter of the opening 50a (i.e. when undistorted), it is clear that there will be some "pinching" of the main body of projection shaft 130 at the inner edge of the tape opening. This effect is shown enormously exaggerated for purposes of illustration at 50d in FIG. 9A, and it should be recognized that because of the slightness of the distortions involved, there would, in actual practice, be no observable inter-penetration of metal such as that pictured in FIG. 9A. Nevertheless, the slight pinching that does occur is useful for purposes of the present invention because it assures a positive and extremely tight-fitting engagement of the projection 130 and the tape opening at all times during their coincidence, except when they are in the position of incipient disengagement indicated at B in FIG. 9 or the position of beginning engagement suggested in dotted outline at C. The result is that while either of the projections 130 may readily enter the openings 50a upon their first coming into coincidence and may readily retract from the openings at the region of their beginning divergence, the tape and cylinder are nevertheless firmly coupled in a backlash-free manner (i.e. through one or the other of the projections 130) throughout their entire range of operation.

What has been said in the immediately preceding description will make apparent the importance of precise placement of the projections 130, not only in respect to their accurate displacement from one another but also in respect to their radial extension beyond the surface of the cylinder 120. Producing openings for the projection shafts which are exactly 180° displaced about the surface of the cylinder is a matter which is well within the skill of the art. Proper radial extension, of the hemisphere 130a, and more particularly the location of the great circles 130b at the desired radial distance from the surface of the cylinder 120, can be accomplished in the following way.

After the projection part 130 has been formed with a cylindrical shaft portion 130c having a diameter corresponding to that of the tape openings and with a hemispherical end portion 130a having a great circle which exactly matches the diameter of the shaft portion, the cylindrical shaft is positioned to be press-fitted into one of the appropriately sized openings previously formed in the cylinder 120. A precisely dimensioned gage 300 (see FIG. 9B) is used to drive the shaft into the opening to a depth at which the outwardly directed centerpoint of the hemisphere 130a lies exactly $R + T/2$ inches outside the peripheral circle of the cylinder 120. In the expression, $R + T2$, R is the radius of the hemisphere 130a (e.g. about 0.047 inch), and T is the thickness of the tape to be employed — for example, 0.004 inch. To avoid problems associated with driving a member into a blind opening, the interior of the cylinder 120 is partially cut away as indicated at 120b (FIG. 9) to form an accessible interior space. A set screw 131 may be provided to lock the shaft 130c against any possible radial motion.

For operation in the English system it is desirable that the length of the pitch circle of the tape about the cylinder 120 be ten inches or some convenient multiple or submultiple of that figure (e.g. 20 inches as a multiple or 5 inches as a submultiple). The reasons for this, which will be further developed in due course, are related to the special compatibility of 10 (and its multiples) with measurements to be read out in the decimal system. With the circumference of the pitch circle fixed at, say, 10 inches, it will be apparent that the spacing of the openings 50a in the tape 50 should be 10/N where N is an integer greater than unity. It has previously been mentioned that 5 inches has been found to be an advantageous choice for this spacing. It will be useful next to describe the way in which the dimensions of the cylinder 120 (as distinguished from the dimensions of the pitch circle about the cylinder) are determined.

Since, to a very close approximation, the pitch circle 50c (FIG. 9A) lies radially outward from the periphery of the cylinder 120 a distance d corresponding to one half the tape thickness, the radius of the cylinder required to produce the desired pitch circle for a tape of thickness T is $C/2\pi - T/2$, where C is the circumference of the pitch circle. From this, by obvious conversion, the desired cylinder diameter D is calculated as $C/\pi - T$. In a particular case, working with a cylinder of stainless steel and a preferred pitch circle diameter of 10 inches, this approach yields the following results:

Tape thickness $T = 0.004$ inch;

Linear spacing of tape openings $(S) = 5$ inches;

Desired pitch circle circumference $= 2S = 10$ inches;

Desired pitch circle diameter $D = 2S/2\pi = 3.1831$ inches;

Displacement (d) of the pitch circle from the cylinder surface $= T/2 = 0.002$ inch;

Computed cylinder diameter $= D - 2d = 3.1831 - 0.004 = 3.1791$ inches.

From the foregoing, it will be seen that, subject to extremely small corrections which can be readily incorporated in manufacturing procedures, the desired circumference of the cylinder 120 for the embodiment of FIG. 9 may be described as substantially equal to two times the spacing of the tape openings 50a minus $2\pi$ times the displacement $d$ between the outer periphery of the cylinder 120 and the effective pitch line of the tape when in engagement with the peripheral surface of the cylinder.

Because the program of dimension determination described above depends critically upon having established with exactitude the spacing of the openings in the tape 50, a tested procedure for this manufacturing step will next be described. Referring to FIG. 10, there is shown a bench setup which comprises a longitudinally slotted base member 150 having a block 152 fixedly secured at its right hand end. To the top of this block there is attached (e.g. by a clamping bolt 154) one end of a length of spring metal tape 49 from which is to be formed the regularly punched tape 50 of FIGS. 1 through 9. Near the other end of the base member 150 there is provided a slidable block 158 having its upper surface precisely aligned with the similar surface of the block 152. The tape 49 is secured to the block 158 as indicated at 159 and, when appropriate sliding force is applied to this block, is held in a flat horizontal plane by the two blocks 152 and 158. In order that the appropriate force may be applied, a hanging weight 160 is attached to the block 158 by a cord 162 riding over a pulley 164. This weight is of known magnitude (e.g. 18–20 pounds) so that a precisely predetermined tensile stress in a range of, say, 8000 to 12000 pounds per square inch may be applied to the tape at all times during the subsequent operations now to be described.

Channeled in a slot 156 extending longitudinally of the base member 150 is a slidable structure 170 which includes a die-forming assembly (to be described) by which precisely dimensioned circular holes are to be produced in the tape 49. A section of the structure 170 is shown in FIG. 11, in which the structure is seen to have an upper part 172 and lower part 174. These two parts are separable but, when conjoined, are held in vertical alignment by aligning pins 176. The lower part 174 has in its upper surface a shallow slot 179 dimensioned to receive snugly the tape 49 as shown in FIG. 11. This part further has a vertical cylinder opening 177 terminating at its upper end in a still larger opening 178. In the latter opening there is inserted a hardened steel die 180 having a central cylindrical opening 182, the diameter of which corresponds precisely to the diameter of the holes to be produced in the tape 49. The upper structural part 172 incorporates a second die part 184 having a vertical opening 186 aligned with opening 182. In use of the structure 170, a hardened cylindrical punch 188, conforming in diameter to the latter openings 182 and 186, is introduced into the latter opening as shown in FIG. 11. This punch, when struck sharply at its upper end, will drive through the tape 49, removing a circular piece of metal and leaving a hole the diameter of which is precisely that of the punch itself. The latter dimension is of course, preselected to provide a hole size which will match exactly the known diameter of the hemispherical projection part 130a (FIG. 9). In a particular case, a diameter of 0.09373 inch has been found suitable for the hole and the projection part. Precise spacing of the centers of successive holes formed in the tape 49 is accomplished by a procedure now to be described.

For coaction with the slot 156 formed in the base member 150 the die-carrying part 170 has a downwardly extending rib 189 (shown in cross-section in FIG. 11). The interfit of the rib and slot permits controlled longitudinal sliding motion of the entire part 170. To locate the first hole to be produced in the tape 49 a precise gage (for example, a Johansson block) is introduced into the space between the fixed part 152 and the structural assembly 170 as indicated at 200 in FIG. 10. (Let it be assumed that this first block is 2 inches in length and that it is accurate to better than one ten-thousandth of an inch). The structure 170 is then moved into pressing engagement with the block 200 so that the distance between its end wall and the opposing wall of the part 152 is precisely two inches. With this condition maintained, a hole is now formed in the tape 49 by use of the punch 186. Next, the assembly 170 is moved to the left (i.e. to the new station indicated in dotted outline at B). The two-inch gage 200 is removed and a new gage (or combination of gages) 202 measuring precisely 7 inches is introduced between the parts 170 and 152, these parts being brought into firm contact with the gage extremities as before. The punch 186 is again applied, and a second hole is produced in the tape with its center line spaced precisely 5 inches from the center line of the first hole. This procedure is now repeated with a third gage (or gage combination) measuring 12 inches, and this process is continued until a sufficient number of identically spaced holes are produced to provide a punched tape of the length required for application in the apparatus of FIGS. 1 through 9. Let it be noted for future reference that this entire punching operation is conducted with the tape 49 maintained under a known predetermined tensile stress by means of the weight 160. Under these circumstances, and with the gaging procedure just described, the accuracy of location of any given hole with respect to the datum point (i.e. the surface of the block 152) is dependent only upon the gage being used for positioning of that hole. Accordingly, errors (if any) will not be accumulative. That is to say, an error made in the positioning of one hole will not carry over to the next hole.

With some of the critical parameters now established, we may next consider how the apparatus as so far described is made to produce a perceptible indication of the measurements which it is intended to provide. Referring once again to FIG. 6, we can readily deduce that a relative linear left-to-right or right-to-lefft motion of ten inches occurring between the axis of the cylinder 120 and any given point on the lontitudinal axis of the tape 50 (as projected, for example between the casing openings 58a and 58b) will produce one full rotation of the cylinder. This is a necessary consequence of the postulated fact that the pitch circle of the tape about the cylinder has a circumference of precisely 10 inches. A tenth of a revolution of the cylinder will therefore correspond to one inch of relative movement of the cylinder axis and the tape; a hundredth of a revolution to one tenth inch of movement; a thousandth of a revolution to one hundredth of an inch, and, at the practically measurable limit of this process, one one-hundred thousandth of a turn will represent one ten-thousandth of an inch of relative movement. If, then, we can provide a readable indication of the occurrence of each one hundred thousandth of a turn of the cylinder 120, we shall have the ability to observe (and record) relative linear movements to an accuracy of one ten-thousandth of an inch. As will next be shown, this can be accomplished in accordance with the present invention within the limits of reasonable manufacturing capabilities.

To illustrate this point, consider that the right hand dial 105 of FIG. 5 (enlarged in FIG. 6) is to provide a perceptible indication of the occurrence (at some source of linear movement) of motion down to at least one ten-thousandth of an inch. Note that this dial has 100 equally spaced circumferential markings. The spacing between successive ones of these is to be taken as representative of one one-thousandth of an inch of primary motion (i.e. motion of the object the displacement of which is to be measured by the dial). By interpolation between markings, readings down to ten-thousandths of an inch can be made, and, going in the upward direction, a complete rotation of the indicator will represent one tenth of an inch of primary motion. But this complete revolution must in turn correspond to one one-hundredth of a complete revolution of the tape-driven cylinder 120 (i.e. since a complete revolution of that cylinder involves ten inches of circumferential movement taken at the pitch line of the tape 50). The machinist's task, therefore, is to establish a precise 100-to-1 gear ratio between the cylinder 120 and the gear 405 which drives the indicator 106. This can be done by an assembly of parts such as that illustrated in FIG. 8.

This Figure is to be viewed as an irregular section taken upon line 8–8 of FIG. 6 — with the cut-away parts of FIG. 6 being restored for this purpose. A glass cover plate 109 is shown as shielding the upper surface of the assembly, although this is not essential to its functioning. The cylinder 120 is assumed to be keyed to shaft 121, which in turn is supported in anti-friction bearings 122. A sleeve 123 supporting an indicating needle 101 (see also FIG. 5) is affixed to the shaft by a set screw 124 in such a way that the setting of the needle on the shaft may be adjusted at the time the system as a whole is being calibrated for use in its intended setting or for a particular measurement. The needle 101 sweeps the entire face of the dial 100 each time the cylinder 120 completes one full revolution, and has been previously indicated, provides readings in inches the tenths of inches.

Also keyed to the shaft for synchronous rotation with it is a primary spur gear 400. This meshes in turn with a secondary gear 402 affixed to a shaft 403 which further drives a tertiary gear 405. This last-mentioned gear meshes with a final gear 410, keyed to a shaft 412 which drives the microindicator 106 in reference to the dial 105 (FIG. 6). By means of a set screw 126 the indicator 106 is adjustable with respect to the shaft 412 for purposes of calibration. While alternative gear relationships may obviously be chosen, the following have been found suitable in a particular application of the present invention:

| GEAR NO. | TOOTH COUNT |
|---|---|
| 400 | 280 |
| 402 | 28 |
| 405 | 360 |
| 410 | 36 |

It will be apparent that, with the gear train thus provided, the desired reduction of 100-to-1 between the rotation of the shaft 121 and that of the shaft 412 will be accomplished, and reading of hundredths, thousandths and ten-thousandths of inches may be obtained from the coaction of the dial 105 and the indicator 106. Movement over distances greater than ten inches can be, of course, measured by maintaining a count of the number of complete revolutions of the indicator 101 produced by such movement, recognizing that each such complete revolution represents 10 inches of movement, with the concluding partial revolutions of the indicators 101 and 106 measuring the increments which are to be added to the last multiple of 10. It would, of course, be well within the current state of the art to attach the shafts of the indicators 101 and 105 to electronic counting mechanisms capable of converting the revolutions and partial revolutions of these shafts into a remote digital read-out of the measurements otherwise determinable by the dials 100 and 105.

As in all precision equipment, it is important that backlash in the gearing system be eliminated so far as possible. In the low-inertia system provided by the present invention as so far described, this elimination is effectively accomplished by continuously loading or biasing the gear train by a low power torque motor having a lightweight induction or hysteresis rotor 420 directly coupled to the shaft 412 and through this shaft to the gear 410. A single phase stator-winding, indicated schematically at 425, has an energizing connection 427, and functions when energized to apply constant unidirectional torque, on the order of a few hundredths ounce-inches, to the rotor output shaft 412 and, through this, to the gear train. In this way, gearing backlash is eliminated.

While in connection with FIGS. 1, 2 and 5 through 9, the invention has been described in a context in which the tape 50 passes through the casing 58 in the direction of the longest dimension of the casing, it will be understood that this is not essential to the invention's purposes. Thus, FIG. 12 illustrates an alternative embodiment in which the tape 250 passes "from side to side" through the measuring device casing 260. The cover plate of the casing is shown partially broken away to disclose the manner in which the tape may be related to a driven cylinder 320 corresponding in form and function to the cylinder 120 of FIG. 6. It is to be noted in particular that the tape 250 is connected at one end with a tensioning assembly 254 (similar to the assembly 54 of FIG. 5A) by which the tape may be maintained under a predetermined tensile stress corresponding to that at which the spacing of the holes produced in it was established. It may usefully be noted at this point that this stress (as chosen both for punching the tape and for constraining it in its operating assembly) is optimal if it at least equals but does not greatly exceed that required to make the tape conform to the smallest radius of curvature which it must assume in the measuring assembly with which it is associated. Greater tension than this will unnecessarily increase the frictional loading of the system; less will prevent maintenance of designed operating tolerances. For purposes of the present invention, and using structural elements as so far described, a tensile stress of about eight to about twelve thousand pounds per square inch of tape cross-section has been found appropriate.

A still further alternative mode of applying the invention is shown in FIG. 13. Here the element 352 may be taken to represent a machine part of relatively small dimensions, which for one reason or another, is not well adapted for supporting either an elongated tape or a gear and metering assembly of the kind shown, for example, in FIG. 5. This element is to be considered as movable with respect ot a base structure 354 under conditions such that the relative movement of these two parts is desired to be measurable. In this context a measuring assembly 360, corresponding in general construction to the assembly 260 of FIG. 12 is attached to an end surface of the base structure 354. In this case, however, openings are provided at the left hand end of the assembly 360 to permit the entrance and egress of the two oppositely moving ends of a tape 350. This tape has spaced openings, as in the cases previously described. In this case, however, the openings successively engage projections 430 provided at 120° intervals about the surface of a freely rotatable cylinder 420. As in the constructions previously described, the cylinder 420 is coupled through appropriate gearing to calibrated read-out mechanisms, of which one only (numbered 405) is shown.

In the overall assembly of FIG. 13, the tape 350 is anchored at both extremities to the movable machine part 352 as indicated at 355 and 356, the anchorage 356 including tension adjusting means 358 for purposes previously described. At the end of base structure 354 which is remote from the measuring assembly 360, the tape passes over an idler roll 357, similar in diameter to the cylinder 420, and the upper throw 350a of the tape has a free running return to the measuring assembly 360. To this end, open passages through (or beneath) the machine part 352 are provided as suggested by the dotted line 350b. With these arrangements, it will be seen that movement of the part 352 in relation to the base structure 354 will cause identical (although oppositely directed) linear movements of the upper and lower tape segments as they respectively enter and leave the metering assembly 360. Accordingly, this assembly will function to measure the extent of such movement in accordance with the principles previously described.

Figure 14:
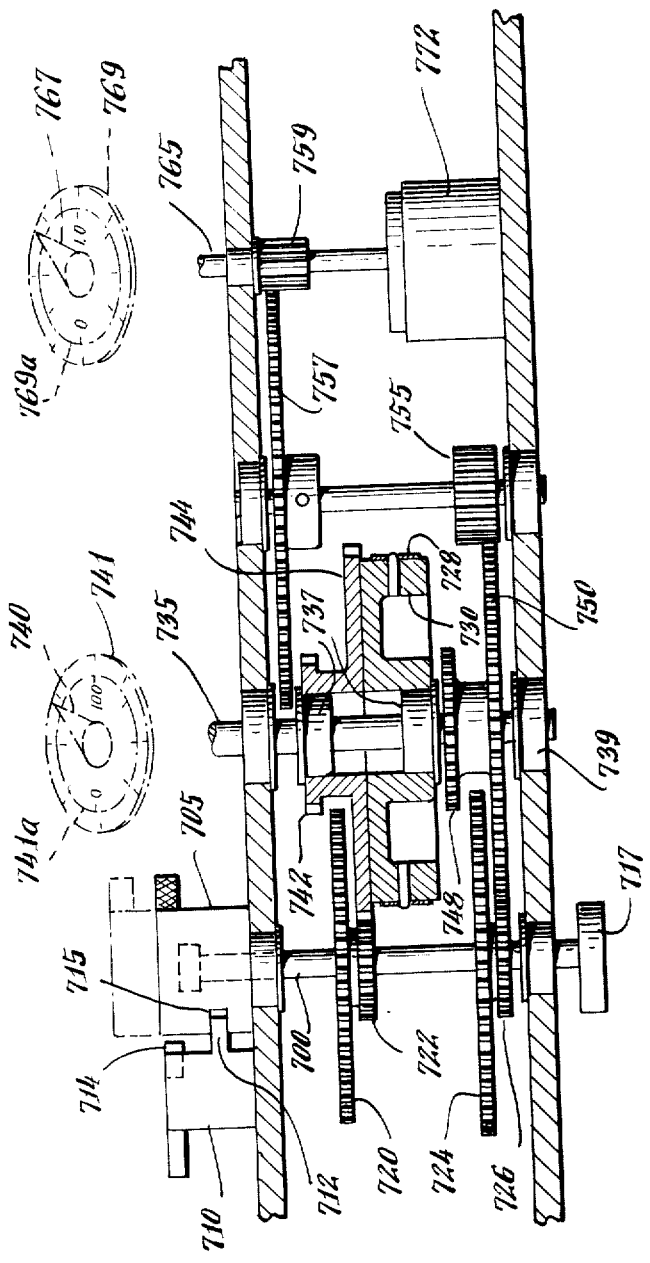
FIGS. 14 and 15 are related sectional views which conjointly illustrate a variable gearing arrangement by which the invention can alternatively be applied to measurements in either the English or the metric system.
Figure 15:
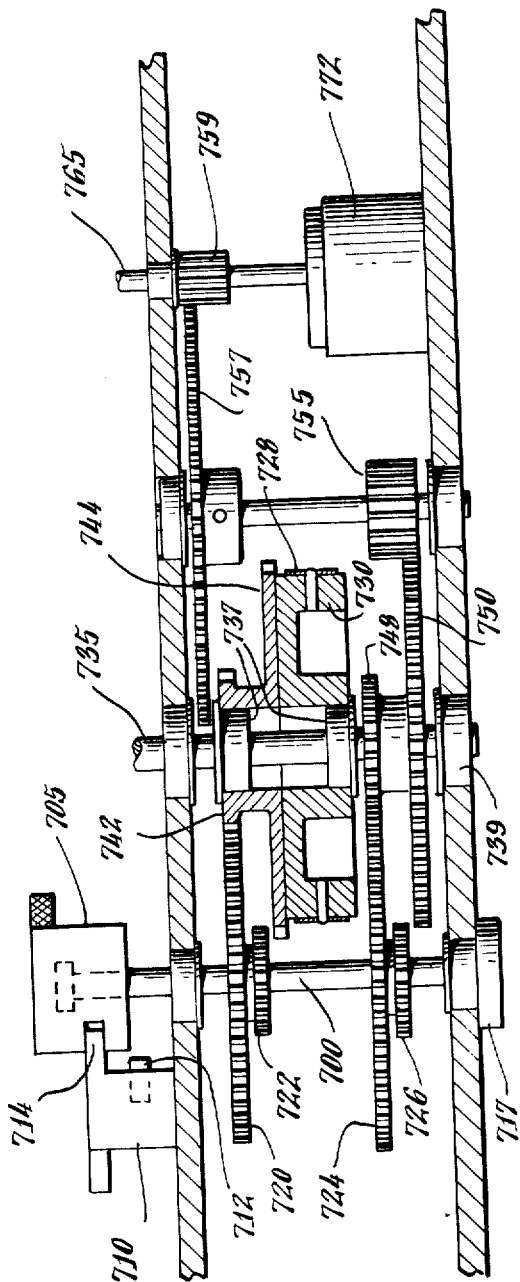

It is a special virtue of the measuring system of the present invention that it is capable of providing, in a single instrument, direct read-out in either the English or the metric systems of measurement. FIGS. 14 and 15 illustrate schematically means by which this can be accomplished.

Referring to FIG. 14, it will be seen that this includes a gear-bearing shaft 700 which has two axially displaced operating positions. It may be moved from one of these positions to the other by means of a liftable notched knob 705 which in FIG. 14 is shown in the lower of its two possible locations. A rotatable latch 710, having a lower retaining member 712 and and upper retaining member 714, each capable of coacting with a notch 715 formed in the knob 705, serves to fix the knob in the position selected by the operator. The shaft 700 bears and has affixed to it a set of four spur gears, respectively numbered 720, 722, 724 and 726. In the lower position of the shaft (FIG. 14) only the gears 722 and 726 are actively engaged, and these in a way which relates to the use of the apparatus in its English system mode. In the upper position of the shaft (FIG. 15) only the gears 720 and 724 are engaged, and these in a way which relates to the use of the apparatus in its metric mode of measurement.

As in the constructions previously described, the measuring function of the device of FIGS. 14 and 15 depends upon relative motion between a precisely tensioned tape 728 and a rotatable cylinder formed to coact with the tape in the manner previously described in connection with FIGS. 1 through 9. A cylinder of the appropriate kind is shown at 730 as being supported for free rotation in respect to an axial shaft 735 by antifriction bearings 737. The shaft itself is also rotationally supported by additional bearings 739 and connects with a read-out indicator 740 having an associated dial 741. (Both of these represented schematically in FIG. 14.) For purposes of further explanation it will be assumed that the cylinder 730 is of such diameter as to provide (i.e. in respect to the tape 728) and effective pitch circle 10 inches in circumference.

Attached to its upwardly directed surface the cylinder 730 carries a cluster gear system having a small diameter gear 742 and a large diameter gear 744, the design and function of these gears being described at a slightly later point. A second cluster gear system, having a small diameter gear 748 and a large diameter gear 750, is attached to the shaft 735 so as to be rotatable with it. In all conditions of operation of the apparatus, the gear 750 provides the driving input to a gear-train comprising gears 755, 757, 759, the last of these being connected to an output shaft 765 to which is attached a microindicator 767 and associated read-out dial 769 (both shown schematically in FIG. 14). For backlash avoidance, a torque motor 772 provides constant loading to the gear system so far described.

Referring now particularly to FIG. 14, let it be assumed that the relationship of the various gears shown in that Figure is being actively engaged is represented by the following table.

| GEAR NUMBER | NUMBER OF TEETH |
|---|---|
| 744 | 280 |
| 722 | 74 |
| 726 | 74 |
| 750 | 280 |
| 755 | 28 |
| 757 | 360 |
| 759 | 36 |

It will be found by conventional calculation that the resultant rotational reduction between gear 744 (with its directly attached cylinder 730) and gear 759 (with its directly attached shaft 765) is 100-to-1. Thus, working with the ten inch pitch circle assumed in connection with cylinder 730, it will be seen that the indicator 767 and the dial 769 can provide readings in ten thousandths of inches as previously explained in connection with the similar construction of FIGS. 1 through 9.

When measurement in the metric system is desired, the alternative apparatus arrangement of FIG. 15 is employed. In this case, the gear pairs 744–722 and 726–750 are disengaged, and the alternative gear pairs 742–720 and 724–748 are brought into engagement. Before specifying recommended ratios for these gears, it will be helpful to discuss the conditions which, without changing (i) the dimensions of the tape engaging cylinder 730, or (ii) the spacing of the openings in the tape 728, will nevertheless permit direct metric system readings to be made from the dial. In this connection, let it be noted that the circumference of the cylinder 730, (projected to the pitch circle of the engaging tape)

becomes in the metric system 254 millimeters. This is not in itself a readily "decimalizable" quantity and therefore cannot produce conveniently decimalized readings at the output dial 767 merely by introduction of a 100-to-1 gear reduction between the shaft 700 and the shaft 765. Otherwise stated, a simple 100-to-1 reduction of 254 millimeters of circumferential motion observed at the periphery of the cylinder 730 as that cylinder makes one full revolution, will translate into 2.54 millimeters for one full revolution of the indicator 767 or into 0.0254 millimeters for each single marking of the dial 769. This obviously does not constitute a practicable scheme of direct read-out.

To overcome this difficulty, the arrangement of FIG. 15 interpolates between the reduction gear chain 750–755–757–759 and the cylinder 730 a "translating gear chain" 742–720–724–748 of which the specifications are as follows:

| GEAR NUMBER | NUMBER OF TEETH |
|---|---|
| 742 | 118 |
| 720 | 236 |
| 724 | 254 |
| 748 | 100 |

The aggregate internal ratio of the chain is $$\frac{118}{236} \times \frac{254}{100} = \frac{254}{200}.$$

Accordingly, it follows that 200 units of input motion taken at the pitch line of the cylinder 730 (where — in the metric mode of operation — one unit represent 1 millimeter) will produce the same 360° rotation of the driven gear 750 as 254 such units (i.e. one complete revolution of the 10 inch cylinder) would produce if the apparatus were operating in the English mode represented in FIG. 14. This means that one complete rotation of the indicator 740, as produced by a corresponding rotation of the shaft 735, will represent a linear measurement of 200 millimeters, readily observable and subdivisible on the inner scale 741a. Moreover, since the gear 750 is the first link in the 100-to-1 conversion system provided by the gear chain 750–755; 757–759, it will be apparent that each revolution of the indicator 767 (FIG. 14) as driven by the gear 759 will represent 200/100 = 2 millimeters of primary movement of the driving tape. Correspondingly, each of the one hundred subdivisions of the dial 769a will represent 0.02 millimeters of indicated motion and each half of a subdivision will represent 0.01 millimeters. A practical decimal read-out is thus provided in respect to a metric system input — whether or not a secondary set of markings are provided on the dial 769 to assist in making decimal interpolations. However, in order to resolve dial ambiguity, I have found it convenient to make the dial removable and to provide an alternative dial which can be substituted when read-out in the metric system is desired.

While a translating gear chain having a 254 to 200 conversion ratio is preferred in the respect that it involves a minimum "percentage departure" from the operation of the apparatus in the English system of measurement, it should be clear that, in principle, a conversion ratio of 254 to 100 could also be used — although with correspondingly greater demands upon the precision and mechanical strength of the gearing employed. Particularly because of the last-mentioned consideration, ratios greater than 254 to 100 do not recommend themselves. A general expression for the permissible range of conversion ratios is "254/100M, where M is a smaller integer." M might obviously be somewhat larger than 2 (e.g. 3).

All of the embodiments so far described depend upon precision coupling between an elongated thin metal tape and the driven cylinder, and, on the basis of experience to date I regard these embodiments as preferred. It should be apparent, however, that certain modifications may be found practicable without departing from the spirit of the invention.

For example, I conceive that the elongated member 50 of FIG. 1 could be made of other cross-section than that of the tape so far described and of a material other than spring steel, provided such material is selected to have adequate flexibility and to maintain reproducible longitudinal dimensions under predetermined tensile stress. To exemplify such an alternative, I have shown in FIG. 16 an elongated flexible plastic strip 500 selected to be of high dimensional stability, and having a transverse cross-section as shown in FIG. 17. Along the broad surface of this member there are provided a succession of equally-spaced rectangular openings 510 with their orthogonal interior surfaces respectively parallel to and perpendicular to the long edges of the member 500. The leading and trailing interior surfaces of the openings have a curved sectional contour as shown in FIG. 17, with the curve described by each of these edges being an involute developed upon the surface of a cylinder with which the face of the member 500 is to be maintained in contact.

The mode of use of the elongated member 500 is analogous to that of the tape 50 of FIGS. 1 through 9 and is illustrated in FIG. 19. Here the member 500 is shown as being in peripheral contact with a cylinder 520 which is assumed to perform the function of the cylinder 120 of FIG. 6. In this case, however, the cylinder is shown as having three (rather than two) equally-spaced projections 530 adapted to coact with the openings 510. To assure this coaction, the member 500 is — by idler pulleys or otherwise — maintained in contact with the cylinder surface over a peripheral arc at least equal to and preferably somewhat greater than 120°. Moreover, the projections 530 have their respective center lines spaced identically with those of the openings 510 (i.e. at the pitch line of the member 500) in accordance with the principles previously explained. Tensioning means for the member 500 are assumed to be provided as in FIGS. 1 and following. The projections 530 are constructed so that their outer surfaces conform to the inner surfaces of the openings 510, being tapered for this purpose as indicated in FIGS. 20 and 20A, B and C, where the last three figures are sections taken upon FIG. 20 as indicated. Section 20B may be considered as taken in a plane which, in the context of FIG. 19, will lie substantially in the pitch line of the member 500. At section 20B the transverse dimension X is substantially the same as that of the similarly designated dimension of section 20C. Above section 20B, however, the projection may suitably be tapered inwardly as indicated by comparison of the dimensional indications X and Y of FIG. 20C.

In addition to illustrating one possible variation in the form of the elongated flexible driving member to be employed, FIG. 19 also demonstrates that the invention is not limited to the use of only two diametrically opposed engaging members formed on the surface of the driven cylinder. Nevertheless, because of the difficulties otherwise encountered in maintaining the very precise dimensional relationships upon which the effectiveness of the invention depends, I prefer to limit the number of projections to four or less. Moreover, I consider that the two-projection embodiment of FIGS. 6 through 9 offers the optimum construction from the standpoint of both precision and manufacturing economy.

A generalized expression for the dimensions of the driven cylinder (120 in FIG. 6 and 520 in FIG. 19) is that it shall have a circumference $NS - 2\pi d$, where N is a small whole number greater than one, S is the spacing of the centers of the openings in the elongated driving member, and d is the displacement between the outer periphery of the cylinder and the effective pitch line of the driving member about the cylinder. A cylinder so dimensioned should have N projections extending outwardly from its periphery with their effective centers on a circle the plane of which also contains the centers of the openings in the elongated member, the projection centers being accurately separated about the circumference of the cylinder by angles corresponding to $2\pi/N$ radians. Each of the projections should have a transverse cross-section (taken about a center which lies in the surface of revolution that contains the effective pitch line of the elongated member) which section coincides in shapes with the shape of the openings in the elongated member. It should preferably also have, in the plane which contains the center lines of these openings, a cross-section of the leading and trailing edges of which approximate an involute curve constructed upon a base circle which follows the periphery of the cylinder. The elongated member should engage the periphery of the cylinder over an arc at least equal to (and preferably somewhat in excess of) $2\pi/N$ radians and in which the projections on the cylinder may enter and retract from the openings in the member upon relative rolling motion between the member and the cylinder.

It will also be apparent to those familiar with machine tool practice, that under some conditions one or the other of the dial indicator shafts 121 and 412 (FIGS. 6 and 8) can also serve as the input shaft for applying the motive power by which the movable machine tool part 17 of FIG. 1 (for example) is to be moved in respect to the bed 20. That is to say, in a system in which the inertia of the machine tool parts is not too great in proportion to the structural strength of the rotatable measuring parts, the latter can be connected directly to the tool-moving power source without sacrificing their concurrent measuring capabiltiy.

Other modifications will occur to those skilled in the art, and I intend in the appended claims to cover all such modifications as fall within the true spirit and scope of the invention.

I claim:

1. A measuring system for apparatus having two parts that are linearly movable with respect to each other to accurately determine such linear movement and to the relative position of the parts to one another, said system comprising,
   A. a first part on the apparatus; and
   B. a second part on said apparatus linearly movable with respect to said first part;
   C. a tape having a number of identically formed openings spaced at equal intervals along at least a substantial portion of its length, the centers of said openings being in a plane perpendicular to the width of said tape and parallel to the tape edges; the arcuate spacing S of the centers of said openings being maintained when said tape is elongated by being subject to substantially the same longitudinal tensile strain as when said openings were formed in said tape;
   D. securing members for supporting the extremities of said tape in fixed relation with reference to said first part at points which are displaced along a line which parallels the line of relative movement of the two apparatus parts, said securing members including a tensioning portion having means for subjecting said tape to substantially the same elongating tensile strain as when said openings were formed therein to maintain the precise spacing S between said openings;
   E. a cylinder rotatably supported in fixed relation to said second part and having its axis of rotation perpendicular to the plane of said openings in said tape, said cylinder further having
      1. a diameter of $NS/\pi$-T, where N is a small whole number greater than one and T is the thickness of said tape,
      2. N projections extending outwardly from and equally spaced about the periphery of said cylinder with their effective centers on a circle the plane of which also contains the centers of the openings in said tape, the projection centers being accurately separated by angles corresponding to $2\pi/N$ radians, each of said projections being formed to facilitate their entry into and retraction from the openings in said tape, upon relative rolling motion between said tape and the cylinder periphery;
   F. means for maintaining the center line of said tape in the same plane throughout its operative length and in close circumferential contact with the periphery of said cylinder through an arc of at least 360°/N but less than 360° whereby at least one projection is engaged at all times with one of said tape openings; and
   G. means for translating the rotation of the cylinder produced by relative motion between the cylinder and said tape caused by movement of the movable one of said apparatus parts into a perceptible measurement of such movement,
      1. said means including a torque motor to exert a unidirectional torque upon said cylinder, whereby each of said projections engages the same portion of said tape openings as said tape passes over and drives said cylinder.

2. A measuring system according to claim 1 in which the means for maintaining said tape in engagement with the rotatable cylinder are idlers positioned adjacent said cylinder to maintain such engagement over an arc at least equal to $2\pi/N$ radians.

3. A measuring system according to claim 1 in which the means (G) for translating the rotation of said cylinder into a perceptible measurement of movement includes,
   1. a gear system driven by said cylinder converting its rotation into a greatly increased output rotation indicative of a decimal part of said cylinder's rotation, a. said torque motor being engaged with the output of said gear system to exert a constant unidirectional torque on all moving parts of said gear system and said cylinder whereby each gear in said gear system always engages an adjacent gear on the same gear tooth sides to prevent gear backlash; and 2. a readout device driven by said gear system.

4. A measuring system for use with apparatus having a part which is to be moved linearly with respect to a relatively fixed part, said system comprising,
   A. an elongated flexible tape having a number of openings with their center spaced at equal intervals along its length, the spacing S of said centers being precisely known as long as said tape is subjected to longitudinal tensile stress within a predetermined narrow range of stress;
   B. An assembly having disposed therein a cylinder having its outer periphery engaged by said tape, said cylinder further having a circumference slightly less than NS, where n is a small whole number greater than one;
   C. N projections extending outwardly from the periphery of said cylinder with their centers being separated by angles corresponding to $2\pi/N$ radians, each of said projections having a transverse cross-section which coincides in shape with the openings in said tape;
   D. idlers adjacent said cylinder for retaining the tape in contact with the cylinder in which it engages the periphery of the cylinder over an arc at least equal to $2\pi/N$ radians but less than 360°, whereby the projections may enter the retract from the openings in said tape upon relative rolling motion between said tape and the cylinder;
   E. bearings mounting said cylinder in said assembly so that it is free to rotate upon relative rolling motion between said cylinder and the engaging portion of the tape;
   F. means for attaching the assembly to the apparatus;
   G. securing assemblies attaching the tape to said apparatus with said tape maintained under tensile stress within said predetermined range, the center line of said tape being held in the same plane throughout its operative length;
   h. said securing assemblies being located so that either (i) the axis of the cylinder or (ii) a point on the longitudinal axis of said tape may be made to move in concordance with the movement of the said movable part of the the apparatus while the other of these remains fixed with respect to that part; and
   I. means for translating the rotation of the cylinder produced by relative motion between the cylinder and the tape into perceptible measurement of the movement of said movable part.

5. A measuring system for use with apparatus having a part which is to be moved linearly with respect to a fixed part, said system comprising,
   A. an elongated flexible tape having a number of circular openings with their centers spaced at equal intervals along its length, the spacing of said centers being precisely known as long as said tape is subjected to longitudinal tensile stress in a predetermined narrow range of stress;
   B. An assembly having disposed therein a cylinder having an outer peripheral surface, the extension of which in the direction of the wheel axis approximates or exceeds the width of the tape, said cylinder further having
   1. a circumference equal to two times the spacing of the centers of the tape openings minus $2\pi$ times the displacement between the outer periphery of the wheel and the effective pitch line of the tape when in engagement with the peripheral surface of the cylinder, and
   2. a pair of projections extending outwardly from the periphery of the cylinder at diametrically opposed regions of such periphery, the outer extremities of said projections comprising hemispheres the great circles of which have
      a. centers which lie approximately in the surface of revolution which contains the said effective pitch line of the tape, and
      b. diameters which match the diameters of the said openings in the tape;
   C. idlers for retaining the tape in contact with the cylinder in which it engages the periphery of the cylinder over at least one half of the cylinder's circumference and in which the said projections may enter and retract from the tape openings upon relative rolling motion between the tape and the cylinder periphery;
   D. bearings mounting said cylinder in said assembly so that it is free to rotate upon relative rolling motion between it and the engaging portion of the tape;
   E. securing members for attaching said assembly and said tape to the apparatus so that either the axis of said cylinder or a point on the longitudinal axis of said tape moves linearly in precise concordance with the movement of the movable part of the apparatus and in a direction perpendicular to the axis of rotation of said cylinder while the other element of such assembly remains stationary with reference to the movable part, the center line of said tape being held in the same plane throughout its operative length;
   F. an adjustable portion on at least one of said securing members for applying tensile stress to the tape in said predetermined narrow range of stress; and
   G. means for translating the rotation of the cylinder produced by relative motion between the cylinder and the tape caused by movement of the said movable apparatus part into a perceptible measurement of such movement.

6. A measuring system according to claim 5 in which said idlers are positioned adjacent said cylinder to maintain said tape in engagement with the periphery of said cylinder over more than 180 but less than 360° of wheel arc.

7. In a measuring system for use with machinery of the type which has a fixed part and a part which is linearly movable with respect to the fixed part, the combination comprising,
   A. an elongated flexible tape having a number of similar openings with their centers spaced at precisely equal intervals S along its length;
   B. An assembly having disposed therein a cylinder having its outer periphery engaged by said tape, said cylinder further having a circumference slightly less than NS, where N is a small whole number greater than one;
   C. N projections extending outwardly from the periphery of the cylinder with their centers being separated by angles corresponding to $2\pi/N$, each of said projections having a transverse cross-section at the pitch line of the tape about the cylinder which coincides in shape with the openings in said tape;

D. means for retaining the tape in contact with said cylinder in which it engages the periphery of the cylinder so that the projections may enter and retract from the openings in the tape upon relative motion between the tape and the cylinder, the center line of said tape being held in the same plane throughout its operative length;

E. means mounting said cylinder in the said assembly so that it is free to rotate upon relative motion between the assembly and the engaging portion of said tape;
 1. said assembly having means for attaching it to either the fixed or the movable part of the machinery and said tape having means for attaching said tape to the part of such machinery to which the assembly is not attached, whereby motion of the movable part in relation to the fixed part will cause corresponding relative motion between the tape and the cylinder;
  a. said attaching means including an adjustable securing assembly means for maintaining said tape under substantially the same longitudinal tensile strain as when said openings were formed in said tape;

F. a gear system driven by the cylinder for converting its rotation into a greatly increased output rotation indicative of a decimal part of the rotation of the cylinder as produced by relative motion between the fixed and movable parts of the machinery;

G. a read-out driven by said gear system; and

H. means for interposing in said gear system a translating gear having a conversion ratio of 254/100M, where M is a small integer, thereby to permit decimal read-out in the metric rather than in the English system of measurement without changing other parameters of the measuring system.

8. In a measuring device having a fixed part and a movable part, the combination comprising
A. a tape having a plurality of spaced openings along a line parallel to the longitudinal center line of said tape;
 1. the centers of said openings being spaced a distance of S from one another;
B. a cylinder having a circumference slightly less than NS and rotatably mounted on one of the fixed or movable part of said device, and around which said tape is closely engaged on an arc of said cylinder of more than 180° and less than 360°, N being a small whole number,
 1. said tape being held in such engagement by idlers adjacent said cylinder,
 2. said cylinder wheel axis being perpendicular to the plane of the tape longitudinal center line,
 3. and having N projections extending from the periphery of said cylinder,
  a. with the centers of said projections being spaced around said cylinder at angles of $2\pi/N$ radians,
  b. each of said projections closely interfitting into said tape openings;
C. securing assemblies at each end of said tape on the part of said device other than that on which said cylinder is mounted,
 1. said tape being held under tension by said securing assemblies,
 2. said securing assemblies and idlers being aligned to hold the longitudinal center line of said tape in a single plane along the operative length of said tape; and
D. means for translating and displaying the rotative movement of said cylinder into units of measurement.

* * * * *

UNITED STATES PATENT OFFICE
CERTIFICATE OF CORRECTION

PATENT NO. : 3,936,943
DATED : February 10, 1976
INVENTOR(S) : Edward P. Bullard, III It is certified that error appears in the above-identified patent and that said Letters Patent are hereby corrected as shown below:

```
Column 1,  line 37,   "capable" should be --cable--;
           line 59,   "determined" should be --determine--.
Column 2,  line 1,    "lost" should be --low--.
Column 3,  line 42,   "partial" should be --partially--.
Column 4,  line 31,   "occupied" should be --occupies--.
Column 5,  line 32,   "accurancy" should be --accuracy--;
           line 48,   insert --in-- between "show" and "a".
Column 6,  line 34,   "directly" should be --directed--.
Column 7,  line 34,   "lines" should be --lies--.
Column 10, line 52,   "lefft" should be --left--.
Column 13, line 6,    "ot" should be --to--;
           line 56,   "and" (second occurrence) should be --an--.
Column 14, line 15,   "and" should be --an--;
           line 34,   "is" (first occurrence) should be --as--.
Column 17, line 31,   "shapes" should be --shape--;
           line 63,   delete "to" between "and" and "the".
Column 18, line 8,    "subject" should be --subjected--.
Column 19, line 21,   "n" should be --N--;
           line 33,   "the" (first occurrence) should be --and--.
Column 21, line 37,   insert --chain-- between "gear" and "having".
```

Signed and Sealed this

Thirteenth Day of July 1976

[SEAL]

Attest:

RUTH C. MASON
*Attesting Officer*

C. MARSHALL DANN
*Commissioner of Patents and Trademarks*